US006496976B1

(12) United States Patent
Smith et al.

(10) Patent No.: US 6,496,976 B1
(45) Date of Patent: Dec. 17, 2002

(54) METHOD AND SYSTEM FOR DYNAMIC RECOMPILATION OF STATEMENTS OF A FIRST LANGUAGE EMBEDDED IN A PROGRAM HAVING STATEMENTS OF A SECOND LANGUAGE

(75) Inventors: Jennifer J. Smith, Eden Prairie, MN (US); James M. Plasek, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/369,216

(22) Filed: Aug. 5, 1999

(51) Int. Cl.[7] .............................. G06F 9/45; G06F 9/44
(52) U.S. Cl. ....................................... 717/145; 717/168
(58) Field of Search .......................... 717/145, 110–113, 717/136–168, 122; 707/2–6, 100–101; 711/200, 202, 205–209, 221

(56) References Cited

U.S. PATENT DOCUMENTS

| | | | | |
|---|---|---|---|---|
| 5,625,822 A | * | 4/1997 | Brett ........................... | 717/145 |
| 5,717,911 A | * | 2/1998 | Madrid et al. ................. | 707/2 |
| 5,854,932 A | * | 12/1998 | Mariani et al. .............. | 717/145 |
| 5,905,892 A | * | 5/1999 | Nielsen et al. ............... | 717/145 |
| 6,073,129 A | * | 6/2000 | Levine et al. ................. | 707/4 |
| 6,078,744 A | * | 6/2000 | Wolczko et al. ............. | 717/145 |
| 6,094,529 A | * | 7/2000 | Jeffries et al. ............... | 717/110 |
| 6,308,320 B1 | * | 10/2001 | Burch ......................... | 717/145 |
| 6,341,302 B1 | * | 1/2002 | Celis .......................... | 709/100 |

OTHER PUBLICATIONS

Bivens et al. Reuse of Compiler Analysis in a Programming Environment. ACM 1989. pp. 368–373.*
Tichy. Smart Recompilation. ACM. Jul. 1986. pp. 273–291.*

* cited by examiner

Primary Examiner—Gregory Morse
Assistant Examiner—Wei Zhen
(74) Attorney, Agent, or Firm—Charles A. Johnson; Mark T. Starr; Crawford Maunu PLLC

(57) ABSTRACT

A method and system for processing statements of a first language embedded in a program having statements of a second language are described in various embodiments. Statements of the first and second languages are compiled into an executable program, the executable program including original executable instructions associated with the statements of the first language. The executable program is executed, and during execution, recompilation conditions are detected for statements of the first language. In response to the recompilation conditions, selected statements of the first language are recompiled, during execution of the executable program, into new executable instructions. The new executable instructions are respectively associated with the selected statements and are executed in place of the original executable instructions.

17 Claims, 6 Drawing Sheets

METHOD AND SYSTEM FOR DYNAMIC RECOMPILATION OF STATEMENTS OF A FIRST LANGUAGE EMBEDDED IN A PROGRAM HAVING STATEMENTS OF A SECOND LANGUAGE

FIELD OF THE INVENTION

The present invention generally relates to computer program compilers and program execution environments, and more particularly to processing statements of one language embedded in a program written in another language.

BACKGROUND OF THE INVENTION

Some compilers and database management systems, for example, the UCS and RDMS systems from Unisys Corporation, support SQL statements embedded in programs of various languages. For example, many application programs are written in the COBOL programming language and have embedded therein SQL statements that reference a database. Embedded SQL statements allow an application programmer to use SQL techniques and SQL-compatible database management systems in combination with COBOL application programs, for example.

The example UCS and RDMS systems have the capability to compile application programs having embedded SQL statements. Continuing the example having SQL statements embedded in a COBOL program, a COBOL compiler compiles the COBOL statements, and when an SQL statement is encountered, the SQL statement is passed to a compile-time component of RDMS. RDMS resolves the data object names in the SQL statement and creates an execution sequence that optimizes execution of the SQL statement. The resolved names and execution sequence for the SQL statement are saved and combined with the executable program produced in compiling the COBOL code. When an SQL statement is encountered during execution of the compiled program, the resolved names and execution sequence associated with the SQL statement are provided to the runtime component of RDMS for execution.

Having compiled SQL statements offers the advantage of fast execution as compared to interpreted SQL statements. However, interpreted SQL offers increased flexibility in maintaining the program. For example, when changes are made to database definitions, interpreted SQL statements do not need to be recompiled. If the changes in database definition are compatible with the SQL statements, the program can be executed without compilation. However, with compiled SQL statements that are embedded in a program, the program must be recompiled. Since the compilation of embedded SQL statements is performed as an integral part of compiling the application program, the effort required to build a new application with respect to the changed database definitions can be time-consuming. A method that addresses the aforementioned problems, as well as other related problems, is therefore desirable.

SUMMARY OF THE INVENTION

A computer-implemented method for processing statements of a first language embedded in a program having statements of a second language is provided in one embodiment. The method comprises compiling statements of the first and second languages into an executable program, the executable program including original executable instructions associated with the statements of the first language. The executable program is executed, and during execution, recompilation conditions are detected for statements of the first language. In response to the recompilation conditions, selected statements of the first language are recompiled into new executable instructions during execution of the executable program. The new executable instructions are respectively associated with the selected statements and are executed in place of the original executable instructions.

In another embodiment, a system is provided for processing statements of a first language embedded in a program having statements of a second language. The system includes a compiler arrangement, a runtime arrangement, and a database management system. The compiler arrangement is configured to compile statements of the first and second languages into an executable program, the executable program including original executable instructions associated with the statements of the first language. The runtime arrangement is configured to execute the executable program. The database management system is coupled to the runtime arrangement, and is configured to detect recompilation conditions for statements of the first language during execution of the executable program. In response to the recompilation conditions, selected statements of the first language are recompiled into new executable instructions during execution of the executable program, and the new executable instructions are respectively associated with the selected statements. The database management system executes the new executable instructions in place of the original executable instructions.

In accordance with another example embodiment of the invention, there is provided a computer program product that is configured to process statements of one language embedded in a program of another language, as summarized above.

BRIEF DESCRIPTION OF THE DRAWINGS

Other aspects and advantages of the invention will become apparent upon review of the Detailed Description and upon reference to the drawings in which.

Figure 1A:
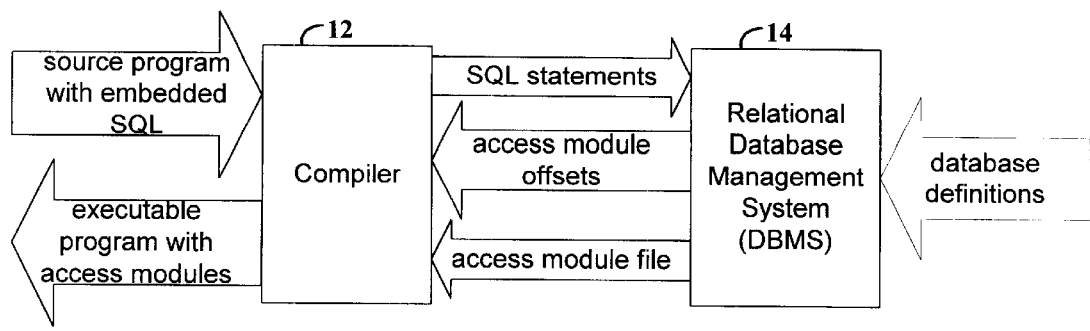
FIG. 1A is a data flow diagram that illustrates, according to an example embodiment, compilation of a source program having embedded SQL statements.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intent is to cover all modifications, equivalents, and alternatives falling within the spirit and scope of the invention as defined by the appended claims.

DETAILED DESCRIPTION

FIG. 1A is a data flow diagram that illustrates, according to an example embodiment, compilation of a source program having embedded SQL statements. The example environment includes compiler 12 interfaced with database management system (DBMS) 14. Compiler 12 is, for example, the UCS compiler system from Unisys Corporation, and DBMS 14 is the RDMS software system, for example, which is also available from Unisys. Those skilled in the art will recognize that comparable software systems and components are available from other sources and may be alternatively used within the scope of the present invention. For example, DBMS 14 may be an object oriented DBMS or a relational DBMS.

Input to compiler 12 is a source program having embedded SQL statements. For example, the source program may be a COBOL program that includes SQL statements for referencing a relational database. Compiler 12 produces executable code from the non-SQL source statements and passes the SQL statements to a compile-time component (not shown) of DBMS 14 for compilation.

DBMS 14 compiles the input SQL statements based on input database definitions. The compilation includes verifying the syntactical and grammatical correctness of the statement and producing an optimized execution sequence that is associated with the statement. The optimized execution sequence is written to an access module that is associated with the statement, and the access module is written to an access module file. For each statement, DBMS 14 returns to compiler 12 an offset that references the access module associated with the statement. The offset is relative to the file of access modules. When the last SQL statement in the source program is compiled by DBMS 14, the access module file is returned to compiler 12, and the final output of compiler 12 is an executable program having appended access modules.

Each definition of a database table includes a timestamp that indicates the time at which the definition of the table was last modified. For an SQL statement that references one or more tables, the timestamps of the referenced tables are also included in the access module. The timestamps are used at runtime to determine whether the SQL statement needs to be recompiled.

Figure 1B:
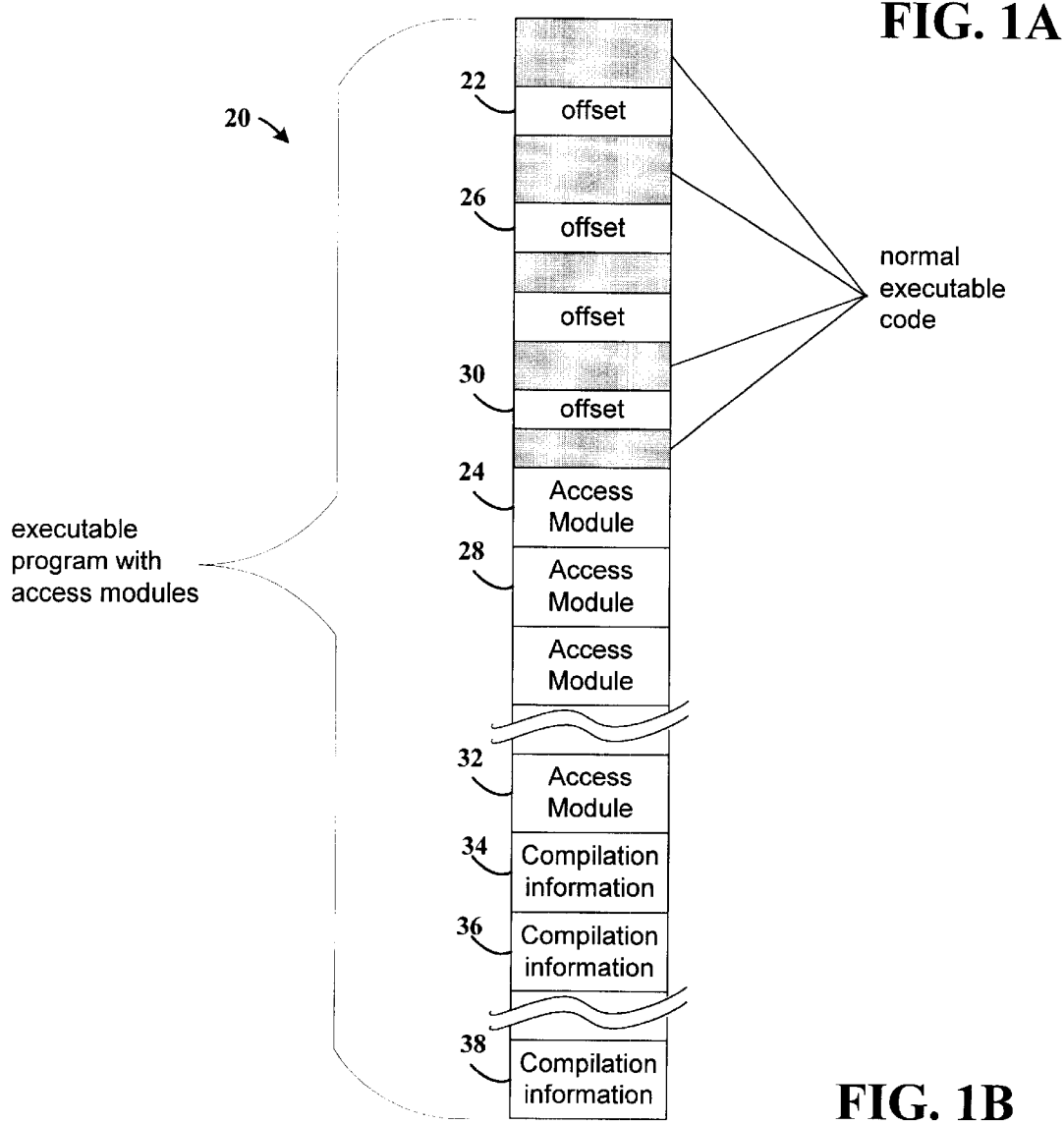
FIG. 1B illustrates an example format of an executable program file produced from an input source program having embedded SQL statements.

FIG. 1B illustrates an example format of an executable program file 20 produced from an input source program having embedded SQL statements. File 20 includes a first portion and a second portion. The first portion includes segments of executable code and interspersed offsets that reference access modules in the second portion. The second portion includes the access modules and compilation information that is associated with the access modules.

When DBMS 14 returns an access module offset to compiler 12 upon compiling an SQL statement, compiler 12 writes the offset to program file 20. The offset references the associated access module, which is written to program file 20 when the access module file is returned from DBMS 14. For example, offset 22 references access module 24, offset 26 references access module 28, and offset 30 references access module 32.

The access module file (FIG. 1A) returned from DBMS 14 to compiler 12 also includes compilation information blocks that are associated with access modules that can be dynamically recompiled. The compilation information blocks include the respective SQL statements that were compiled. For example, compilation information block 34 is associated with access module 24, compilation information block 36 is associated with access module 28, and compilation information block 38 is associated with access module 32. Compilation information blocks are only included for SQL statements that must be recompiled when a database definition changes.

Figure 2:
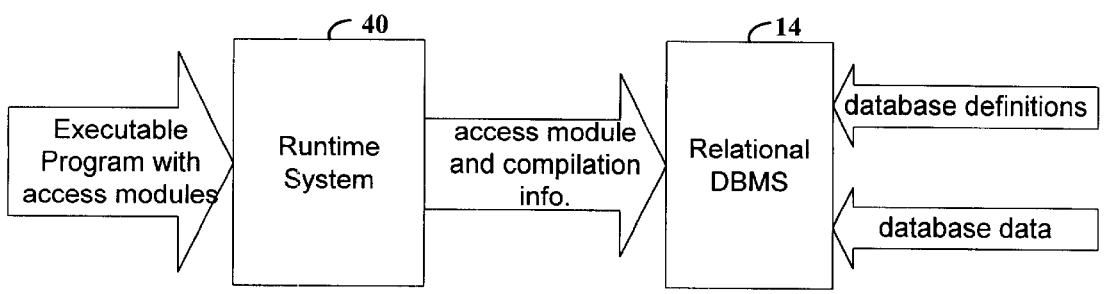
FIG. 2 is a data flow diagram that illustrates, according to an example embodiment, the data inputs and outputs to and from a runtime system and the runtime component of a DBMS.

FIG. 2 is a data flow diagram that illustrates, according to an example embodiment, the data inputs and outputs to and from runtime system 40 and the runtime component of DBMS 14. Runtime system 40 is, for example, the UCS Runtime System (URTS) software product that is available from Unisys.

Runtime system 40 processes an input executable program file 20, and when an offset is encountered, the corresponding access module and compilation information block (if any) are provided to DBMS 14. DBMS 14 then determines whether the SQL statement embodied in the access module needs to be recompiled. In an example embodiment, the timestamps of the access module are compared to the timestamps of the referenced database tables. If the SQL statement is one which requires recompilation and any of the database timestamps are not equal to the access module timestamps, then the associated SQL statement is recompiled using the database definitions that are input to DBMS 14, thereby creating a new access module. If the timestamps in the access module are the same, then no definitions have changed since the SQL statement was last compiled, and SQL statement does not need to be recompiled. The execution sequence in the new access module is then performed, and the new access module also saved for subsequent, repeated execution of the statement.

Figure 3:
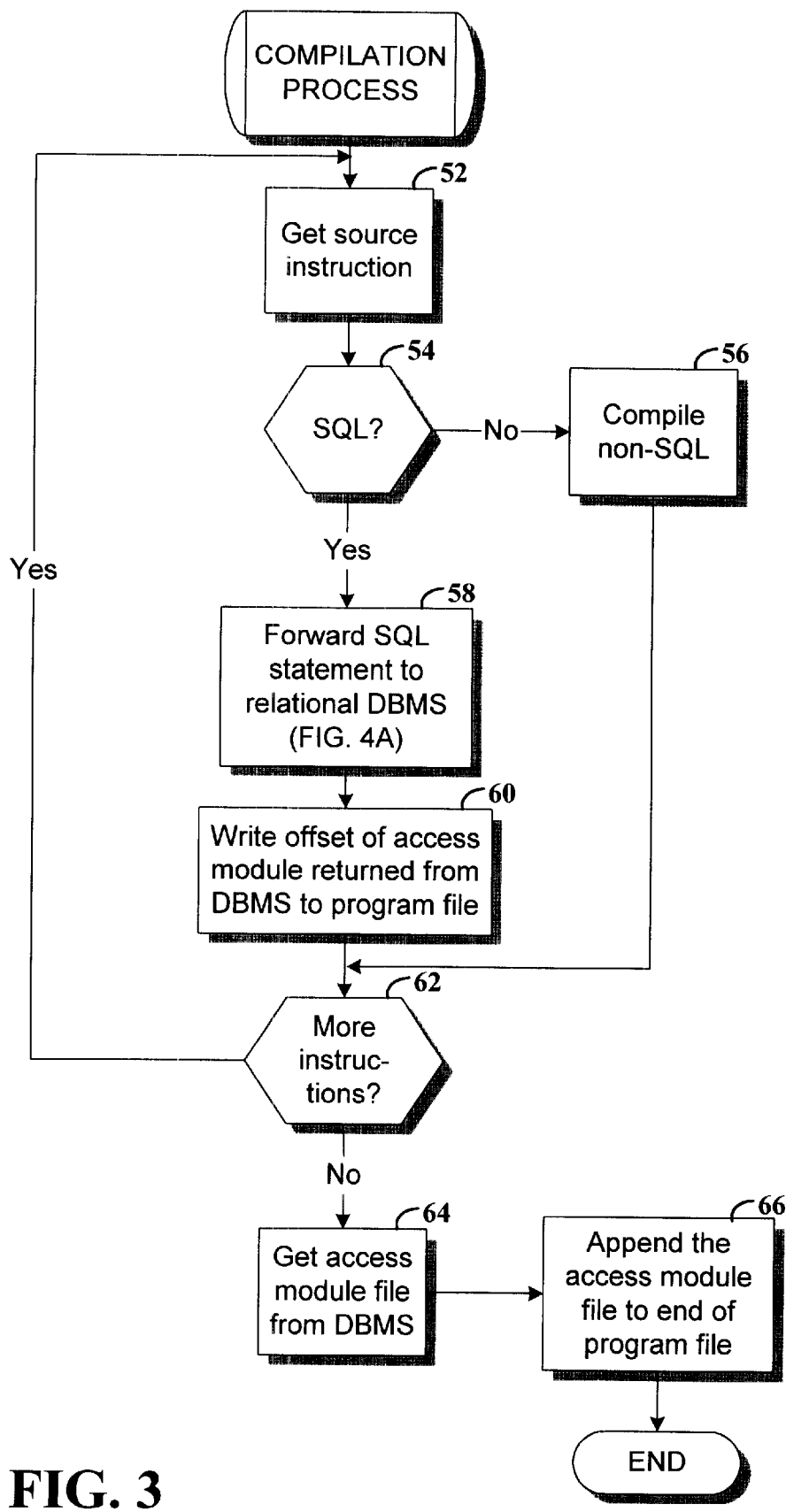
FIG. 3 is a flowchart of a compilation process in accordance with an example embodiment of the invention.

FIG. 3 is a flowchart of a compilation process in accordance with an example embodiment of the invention. The process generally entails compiling non-SQL source code in a conventional manner, and interfacing with a DBMS compilation component to compile SQL statements. The process begins at step 52 where a source code instruction is read from a source file.

Decision step 54 tests whether the instruction is an SQL instruction. Embedded SQL statements are prefixed with a predetermined delimiter, for example, "EXEC SQL" which is followed by the SQL statement. A delimiter such as "END EXEC" marks the end of the SQL statement. For non-SQL instructions, control is directed to step 56 where the instruction is compiled in a conventional manner. Otherwise, control is directed to step 58, where the SQL statement is passed to DBMS 14. DBMS 14 compiles the command and returns an offset that is associated with th e access module for the SQL statement. Note that FIG. 4A shows a process for compiling the SQL statement by DBMS 14.

At step 60, the offset is written to the executable program file. While there are more instructions to process, decision step 62 returns control to step 52 to continue compiling the source program.

Control is directed to step 64 when all the source code has been compiled. At step 64, the access module file is obtained from DBMS 14, and the access module file is appended to the executable program file at step 66. The compilation process produces executable program file 20 having interspersed offsets that reference associated access modules placed at the end of the file.

Figure 4A:
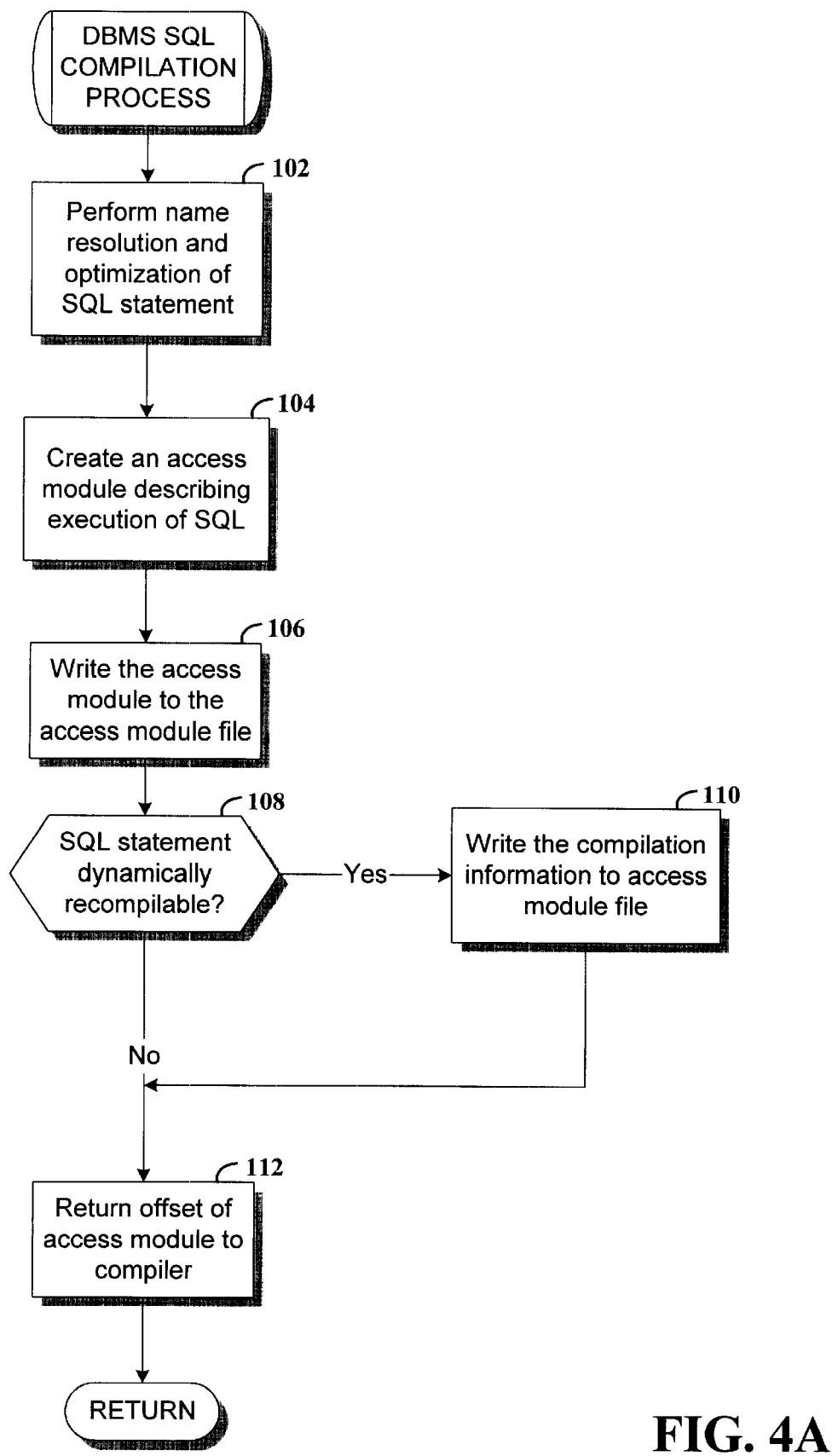
FIG. 4A is a flowchart of an example process for compiling an SQL statement.

FIG. 4A is a flowchart of an example process for compiling an SQL statement. At step 102, DBMS 14 performs name resolution and optimizes the SQL statement. As recognized by those skilled in the art, name resolution involves producing a reference to a particular data element referenced in the statement. For example, a column, Cl, referenced in an SQL statement resolves to a schema name, table name, and column name referencing the specified column, Cl. Optimizing the statement involves examining the SQL statement and producing, for example, a preferred order of reference for a group of tables, sorting method, join method (hash, merge, nested loop) and other optimizations know to those skilled in the art. The optimization information is stored in the access module. Thus, the access module includes a set of execution instructions for interpretation by DBMS 14.

At step 104, an access module is created which describes execution of the SQL statement. The access module includes, in addition to the execution instructions, an index into a table of recompiled access modules (FIG. 4B) and an access module identifier. The index is referenced during runtime if an access module is or has been recompiled. The access module is then written to an access module file at step 106.

Decision step 108 tests whether the SQL statement can be dynamically recompiled. If yes, control is directed to step 110 where a compilation information block is created and written to the file of access modules. In the example embodiment, a predetermined set of SQL statements are defined to be dynamically recompilable. The commands include: INSERT, UPDATE, DELETE, DECLARE CURSOR, UNLOAD, and SELECT.

At step 112, the offset of the access module in the access module file is returned to compiler 12.

Figure 4B:
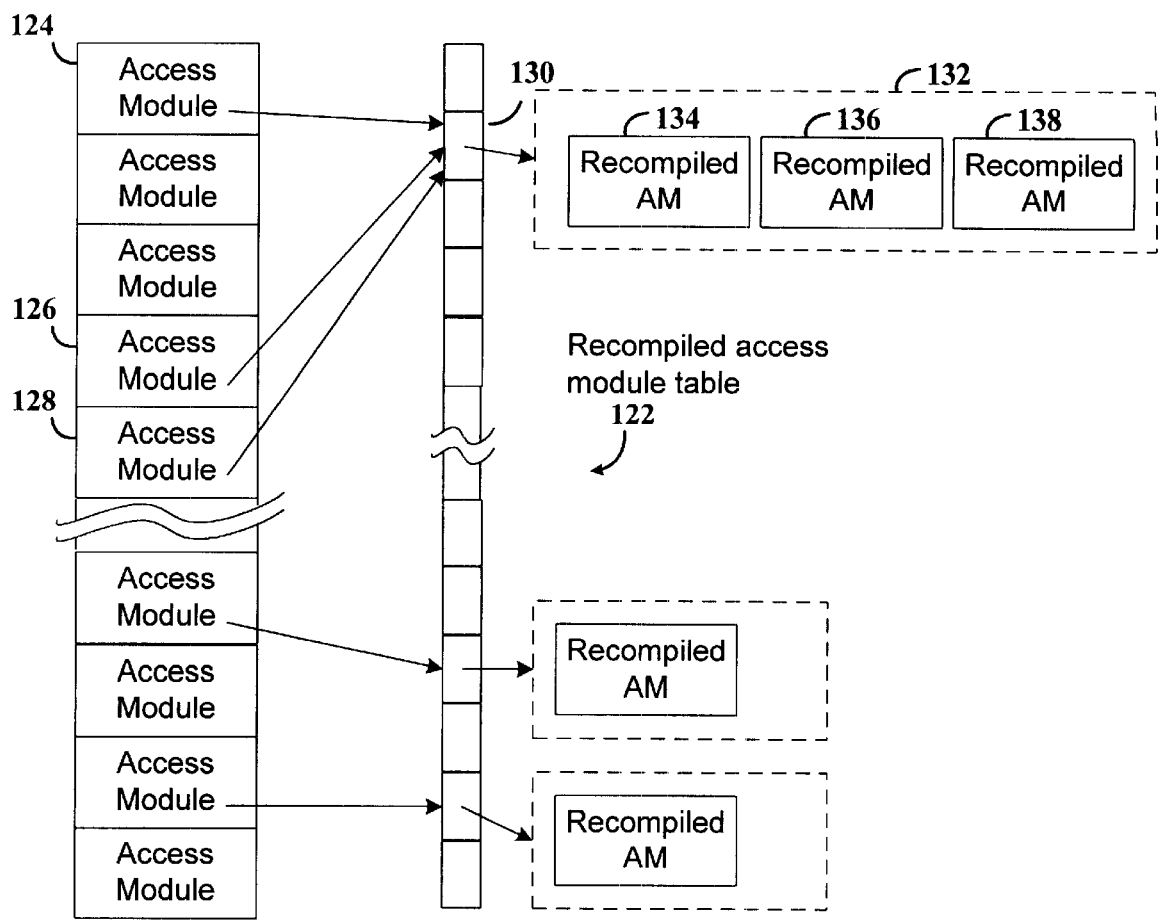
FIG. 4B is a block diagram showing the relationship between access modules, a table of recompiled access modules, and the recompiled access modules.

FIG. 4B is a block diagram showing the relationship between access modules, recompiled access module table 122, and recompiled access modules. "Recompiled access module" refers to the new access module created when an SQL statement has been recompiled. Each access module for which recompilation may be required is assigned an index into table 122. The index into table 122 for an access module is assigned based on a modulo function of a sequential numbering of recompilable statements as they physically appear in the source program and the size of table 130 (statement # MOD table size=index). Each cell in table 122 references a set of recompiled access modules. A set of recompiled access modules referenced by a cell may be empty or contain one or more recompiled access modules. A recompiled access module is added to the set referenced by a cell in table 122 when the SQL statement associated with an access module is dynamically recompiled.

Note that multiple access modules may reference the same cell in table 122. Thus, the access module identifiers are used to differentiate between recompiled access modules in the set. For example, access modules 124, 126, and 128 have table indices that are set to reference cell 130. Cell 130 in turn references set 132 of recompiled access modules 134, 136, and 138. The unique access module identifiers in the access modules are used to select the proper recompiled access modules. For example, the access module identifier of access module 128 is also stored in recompiled access module 138 so that when access module 128 is referenced during program execution after having already been recompiled and executed, DBMS 14 can select the proper recompiled access module referenced by cell 130.

Figure 5:
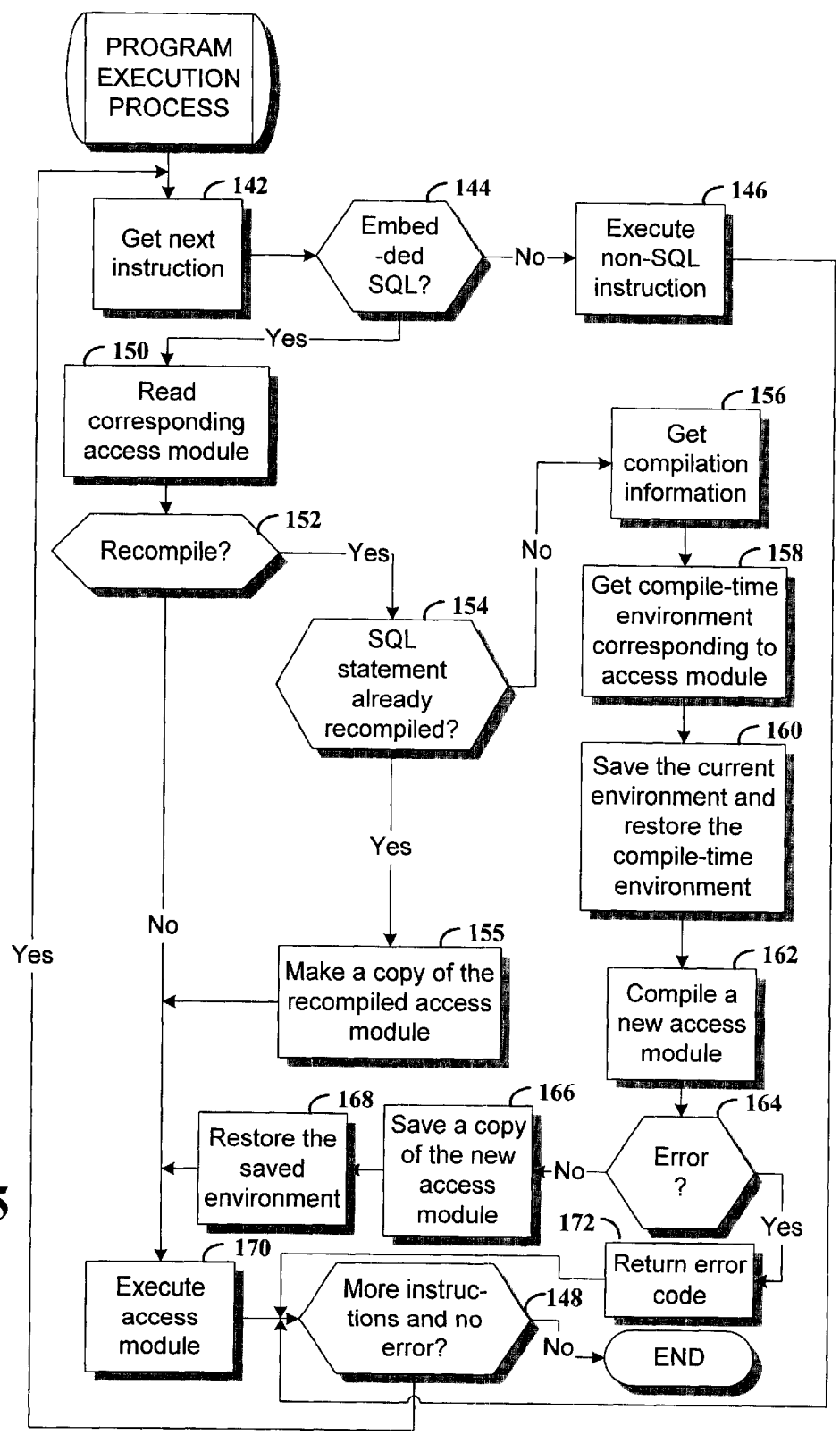
FIG. 5 is a flowchart of an example process for execution of a program having embedded SQL.

FIG. 5 is a flowchart of an example process for execution of a program having embedded SQL. The program is one that is produced from the compilation process of FIG. 3, for example. Generally, the process entails executing non-SQL instructions in a conventional fashion, and for SQL instructions, recompiling if necessary and then executing the recompiled instructions.

At step 142, the process obtains the next instruction to execute, and decision step 144 tests whether the instruction is an SQL instruction. For a non-SQL instruction, step 146 executes the instruction in a conventional manner, and step 148 tests whether there are more instructions to process and no error codes have been returned. If there are more instructions and no errors, control is returned to step 142 to get the next instruction. Depending on the particular error code, the application program may end when it receives an error code.

For an SQL instruction, control is directed to step 150 to read the corresponding access module. Recall from FIG. 1B that the access module is referenced by the offset that is associated with the SQL instruction. Decision step 152 first tests whether the SQL statement is a type that must be recompiled when the database definition has changed. For example, SQL statements such as INSERT, UPDATE, DELETE, DECLARE CURSOR, UNLOAD, and SELECT require recompilation, while other statements do not need to be recompiled. If the statement is a type that requires recompilation when the database definition changes, the timestamp of the access module is compared to the timestamp of the database table(s) referenced by the SQL statement. If the database table(s) has a different timestamp, then the SQL statement must be recompiled.

Decision step 154 tests whether the SQL statement associated with the access module has already been recompiled, and if so, directs control to step 155. Table 122 (FIG. 4B) is used to determine whether the SQL statement has already been recompiled. Specifically, the index into table 122 as present in the access module is used to reference a set of recompiled access modules. If any of the recompiled access modules in the set has an access module identifier that matches the identifier of the access module in process, then the SQL statement has already been recompiled, and the recompiled access module will be used for execution.

Step 155 makes a copy of the recompiled access module for execution so that any changes in the state of any variables are not carried forward to a subsequent execution of the access module. At step 170, the access module is executed, for example by DBMS 14.

Decision step 154 directs control to step 156 if the access module has not yet been recompiled. Step 156 obtains the compilation information associated with the access module. Recall that the compilation information includes the SQL statement that was originally compiled and is now to be dynamically recompiled. The compilation information blocks in program file 20 can be referenced sequentially since they are sequentially written, as necessary, as access modules for SQL statements are written.

Step 158 obtains the compile-time environment that corresponds to the access module, wherein the compile-time environment includes, for example, whether and for what components compile-time statistics are accumulated, table versions, and alias names. The current environment is saved and replaced with the compile-time environment at step 160, and the SQL statement is recompiled to create a recompiled access module at step 162. If no errors were detected in recompilation, then decision step 164 directs control to step 166, where the recompiled access module is saved for subsequent executions. The recompiled access module is saved in the set of recompiled access modules that is referenced by the cell of table 122 having the index that is present in the access module. At step 168, the saved environment is restored, and the processing proceeds to step 170 to execute the recompiled access module. While not shown, it should be understood that recompiled access module table 122 is cleared when an administrator changes a table definition via the ALTER command.

If decision step 164 detects an error during recompilation, for example, the SQL statement references a table that no longer exists, then an error is reported at step 172, and an error code is returned to the application program. In response to the error code, an application program will in this case end to avoid data corruption.

The various embodiments described herein allow programs having embedded SQL statements that reference a changed database definition to execute without recompiling the entire program. Generally, only the SQL statements are recompiled, and the recompilation is performed at runtime.

The present invention is believed to be applicable to a variety of computer programming languages and has been found to be particularly applicable and beneficial as applied to SQL statements embedded in programs of another language. While the present invention is not so limited, an appreciation of the present invention has been provided by way of specific examples involving SQL. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

We claim:

1. A computer-implemented method for processing statements of a first language embedded in a program having statements of a second language, comprising:

compiling statements of the first and second languages into an executable program, the executable program including original executable instructions associated with the statements of the first language;

storing the original executable instructions in respective original instruction blocks;

merging respective references to the original instruction blocks into the executable program;

executing the executable program;

detecting recompilation conditions for statements of the first language during execution of the executable program;

recompiling selected statements of the first language into new executable instructions during execution of the executable program in response to the recompilation conditions, the new executable instructions being respectively associated with the selected statements;

including respective references to the new executable instructions in the original instruction blocks; and executing the new executable instructions in place of the original executable instructions.

2. The method of claim 1, wherein the first language is SQL.

3. The method of claim 2, wherein the selected statements include statements selected from the group of INSERT, UPDATE, DELETE, DECLARE CURSOR, UNLOAD, and SELECT.

4. The method of claim 1, wherein detecting recompilation conditions includes detecting a changed database definition.

5. The method of claim 4, further comprising:

associating during compilation a timestamp of a database definition with the original executable instructions; and comparing during execution of the executable program the timestamp associated with the original executable instructions to a timestamp presently associated with the database definition; and wherein, the recompilation condition is present if the timestamp of the original executable instructions is not equal to the timestamp presently associated with the database definition.

6. The method of claim 1, further comprising:

saving the new executable instructions as saved executable instructions; and executing the saved executable instructions in subsequent references in place of recompiling the selected statements.

7. The method of claim 1, further comprising providing an error code if an error is detected in recompiling any of the selected statements.

8. The method of claim 1, wherein the executable program has a beginning and an end, and further comprising appending the original instruction blocks to the end of the executable program.

9. The method of claim 8, further comprising:

saving the new executable instructions in respective new instruction blocks;

creating a table having cells indexed by the references in the original instruction blocks; and linking cells in the table to associated groups of new instruction blocks.

10. The method of claim 9, further comprising:

including a unique identifier in each of the original instruction blocks; and including in the new instruction blocks the unique identifiers of the associated original instruction blocks.

11. The method of claim 1, further comprising storing the selected statements of the first language with the executable program.

12. The method of claim 11, further comprising using the selected statements of the first language that are stored with the executable program for recompilation.

13. An apparatus for processing statements of a first language embedded in a program having statements of a second language, comprising:

means for compiling statements of the first and second languages into an executable program, the executable program including original executable instructions associated with the statements of the first language;

means for storing the original executable instructions in respective original instruction blocks;

means for merging respective references to the original instruction blocks into the executable program;

means for executing the executable program;

means for detecting recompilation conditions for statements of the first language during execution of the executable program;

means for recompiling selected statements of the first language into new executable instructions during execution of the executable program in response to the recompilation conditions, the new executable instructions being respectively associated with the selected statements;

means for storing respective references to the new executable instructions in the original instruction blocks; and means for executing the new executable instructions in place of the original executable instructions.

14. A system for processing statements of a first language embedded in a program having statements of a second language, comprising:

a compiler arrangement configured to compile statements of the first and second languages into an executable program, the executable program including original executable instructions associated with the statements of the first language and stored in respective original instruction blocks, wherein respective references to the original instruction blocks are merged into the executable program;

a runtime arrangement configured to execute the executable program; and a database management system coupled to the runtime arrangement, the database management system configured to detect recompilation conditions for statements of the first language during execution of the executable program, recompile selected statements of the first language into new executable instructions during execution of the executable program in response to the recompilation conditions, the new executable instructions being respectively associated with the selected statements, store respective references to the new executable instructions in the original instruction blocks, and execute the new executable instructions in place of the original executable instructions.

15. The system of claim 14, wherein the first language is SQL.

16. The system of claim 15, wherein the selected statements include statements selected from the group of INSERT, UPDATE, DELETE, DECLARE CURSOR, UNLOAD, and SELECT.

17. The system of claim 14, wherein the recompilation conditions include a changed database definition.

* * * * *